United States Patent
Wieczorek et al.

(10) Patent No.: US 10,166,925 B2
(45) Date of Patent: Jan. 1, 2019

(54) REAR VIEW ELEMENT FOLDING DEVICE

(71) Applicant: SMR Patents S.à.r.l., Luxembourg (LU)

(72) Inventors: Romeo Wieczorek, Esslingen (DE); Peter Hein, Denkendorf (DE); Alexander Czechowicz, Bochum (DE); Andreas Hermann, Winnenden-Baach (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 15/902,055

(22) Filed: Feb. 22, 2018

(65) Prior Publication Data

US 2018/0194288 A1 Jul. 12, 2018

Related U.S. Application Data

(63) Continuation-in-part of application No. 15/349,657, filed on Nov. 11, 2016.

(30) Foreign Application Priority Data

Nov. 12, 2015 (DE) .................. 20 2015 106 118 U (51) Int. Cl.
*B60R 1/07* (2006.01)
*B60R 1/074* (2006.01)
*B60R 1/076* (2006.01)
*B60R 21/34* (2011.01)

(52) U.S. Cl.
CPC .............. *B60R 1/074* (2013.01); *B60R 1/076* (2013.01); *B60R 21/34* (2013.01); *B60Y 2400/411* (2013.01); *B60Y 2410/136* (2013.01)

(58) Field of Classification Search
None
See application file for complete search history.

(56) References Cited

U.S. PATENT DOCUMENTS

| | | | | |
|---|---|---|---|---|
| 4,087,971 A * | 5/1978 | Hart | ........................ | F03G 7/065 60/527 |
| 2002/0130754 A1* | 9/2002 | Alacqua | ................... | F03G 7/065 337/118 |
| 2011/0222176 A1* | 9/2011 | Browne | ................... | B60R 1/072 359/846 |
| 2015/0097955 A1* | 4/2015 | De Wind | ................ | B60R 1/062 348/148 |

* cited by examiner

*Primary Examiner* — Jennifer D. Carruth
(74) *Attorney, Agent, or Firm* — MacMillan, Sobanski & Todd, LLC (57) ABSTRACT

A rear view element folding device is disclosed for approaching at least one pivot position of an element housing relative to an element foot that can be mounted on the motor vehicle. The rear view element folding device locks or unlocks at least one resting position of the element housing relative to the element foot. A method for triggering such a rear view element folding device is also disclosed.

14 Claims, 8 Drawing Sheets

REAR VIEW ELEMENT FOLDING DEVICE

CROSS-REFERENCE TO RELATED APPLICATIONS

This application is a continuation-in-part of the U.S. application Ser. No. 15/349,657, which claims priority from German Patent Application No. 20 2015 106 118.8 filed on Nov. 12, 2015. The disclosures of these applications are incorporated herein by reference in their entirety.

BACKGROUND OF THE INVENTION

This invention relates in general to rear view devices. In particular, the invention relates to a rear view element folding device for a motor vehicle for approaching at least one pivot position of an element housing relative to an element foot that can be mounted on the motor vehicle, and for locking or unlocking at least one resting position of the element housing relative to the element foot. The invention further relates to a method for triggering such a rear view element folding device.

A drive folding mechanism for a rear view element is known from EP 2 439 106 B1, which is designed to be attached to a motor vehicle. This mechanism comprises a drive folding housing, which can be mounted between an element housing and an element foot that can be mounted on a motor vehicle. Further, a coupling member is provided which is brought into engagement with the element foot using a first spring means, wherein the coupling detent can be axially moved from a locking position and/or engagement position, in which coupling arresting elements hold back a relative rotation between the coupling member and the element foot in a form-fit manner, and an unlocking and/or non-engagement position, in which a friction engagement torque only somewhat holds back the relative rotation between the coupling member and the element foot around an element head axis, wherein the coupling member permits the element housing to be manually moved in relation to the element foot. Additionally, the mechanism comprises an electrical drive train for generating a relative rotation between the drive folding housing and the coupling member around the element head axis, wherein when the coupling member is in the non-engagement position and the electrical drive train generates a relative rotation between the drive folding housing and the coupling member, the drive folding housing rotations relative to the element foot until a drive stop surface of a drive stop means achieves a detent includes counter-torque, wherein the counter-torque is greater than the friction engagement torque, and thus stops the rotation of the drive folding housing in relation to the element foot, and instead causes the coupling member to rotation until the coupling member has reached an engaged position. The drive stop means is movably mounted on the element foot, wherein the drive stop surface is biased axially towards the detent. The drive stop surface moves with the drive folding housing between:
a forward position, in which the drive folding housing and the element head are in a forward folding position;
a rearward position, in which the drive folding housing and the element head are in a rearward folding position; and
a drive position in which the drive folding housing and the element head are in an extended position, the coupling member is in the engagement position and the drive stop surface lies between the detent and the drive folding housing in order to provide a form-fit and repeatable stop.

The known rear view element folding device uses a single motor for changing between the engagement position and the non-engagement position, i.e. for locking and unlocking, as well as for approaching the forward position, rearward position and drive position, i.e. for twisting, which leads to a complex structure.

The invention provides a rear view element folding device for a motor vehicle which has a simple structure, without reducing safety during locking. Large noise developments when approaching different positions of the rear view element should also be avoided. In addition, it should be possible to quickly approach any desired position.

SUMMARY OF THE INVENTION

This invention relates to rear view element folding device for a motor vehicle for approaching at least one rotational position of an element housing relative to an element foot that can be mounted on the motor vehicle, and for locking or unlocking at least one resting position of the element housing relative to the element foot, which is characterized by
a first actuator for a translation movement of a first engagement element that is firmly connected to the element housing relative to a second engagement element that is connected to the element foot along a rotation axis, wherein the first engagement element and the second engagement element in a locking position, such as a locked resting position of the element housing, stand in a fixed engagement with each other and in an unlocking position, such as an unlocked resting position of the element housing, the engagement is released by a certain translation movement, and
a second, separate actuator for a rotational movement for rotating the first engagement element relative to the second engagement element around the rotation axis, wherein through a first rotational movement, a first rotation position of the element housing can be approached from the unlocked resting position, and through a second rotational movement of the element housing, which is counter to the first rotational movement, the unlocked resting position can be approached from the first rotational position.

Here, it can be provided that at least one spring element in the locking position applies a force onto the first and/or second engagement element, and the first actuator moves the first or second engagement element against the force of the spring element during the change from the locking position into the unlocking position, in particular with a lifting movement, wherein preferably, the first actuator holds the unlocking position for a certain period of time.

In one embodiment, the first actuator uses an active material, in particular as a shape memory alloy (SMA) drive, piezo drive or a drive designed with an electroactive polymer, wherein preferably, the SMA drive uses at least one SMA element, in particular in the form of an SMA wire or an SMA spring, on which a current can be applied for the change from the locking position into the unlocking position, in particular in form of at least one current surge and/or over a certain period of time, preferably pulsed.

Here it can be provided that the spring element comprises a spiral spring, conventionally to which the SMA element(s) run, in particular in an evenly distributed manner, and/or each SMA element is shortened trough heating when the current is applied, so that the spring element is compressed from a locking state into an unlocking state, while during the cooling of the SMA element, the spring element returns from the unlocking state, in particular automatically, into the locking state, and/or the first actuator can be adjusted depending on a first travel sensor and/or by means of end switches, in particular mechanical end switches.

The second actuator uses an active material, a magnetic angle adjuster or a motor, in particular an electric motor, which preferably engages via a gear stage onto the first engagement element, and/or the second actuator can be adjusted depending on a second travel sensor and/or by means of end switches, in particular mechanical end switches.

Various embodiments may provide that the first engagement element comprises at least one protrusion for engagement into a recess, which is preferably designed to be complementary to the protrusion, in the second engagement element and/or the second engagement element comprises at least one protrusion for engagement into a recess, preferably designed to be complementary to the protrusion of the first engagement element, wherein preferably, a plurality of protrusions is provided, and/or preferably, each protrusion comprises a trapezoid form in its profile, and/or preferably, the first engagement element comprises a first ring and the second engagement element comprises a second ring, wherein the rings are arranged concentrically to the rotation axis AΦ, and/or the first engagement element is formed as a first gear ring and/or a first clamping element, brake element and/or latching element, and the second engagement element is formed as a second gear ring and/or second clamping element, brake element and/or latching element.

Further, the element foot comprises a basic body, in particular having a cylindrical form, or is firmly connected thereto, the spring element engages on the basic body and the second engagement element, and the first actuator engages on the basic body and the second engagement element, so that a locking device is provided in a cylindrical form, in particular a hollow cylindrical form.

It can also be provided that a control or regulating device for the first and/or second actuator interacts with at least one sensor device, and/or the control or regulating device, the first actuator and/or the second actuator are arranged at least partially in the locking device, in particular in the hollow cylinder.

Here, it is in turn suggested that the sensor device comprises a first sensor for sensing a travel path of the first actuator, such as in the form of a resistance sensor, Hall effect sensor, temperature sensor or current sensor in combination with at least one stop, a second sensor for sensing a travel path of the second actuator, such as in the form of a rotation angle sensor or current sensor in combination with at least one stop, a third sensor for detecting obstacles in the area of the rear view element, a fourth sensor for capturing vibrations, and/or a fifth sensor for capturing the road and/or driving motion.

The rear view element can comprise at least one mirror element and/or camera.

In at least one embodiment, in the locking position, a form fit is provided between the first and second engagement element.

A method is disclosed for controlling the rear view element folding device according to the invention, characterized in that the travel path of the first actuator in the form of an SMA actuator is set using a temperature and/or resistance regulation and/or using the sensor device, and/or the travel path of the second actuator is set using a temperature and/or resistance regulation and/or using the sensor device, and/or the control and regulating device sets a current source for applying current impulses to the first and/or second actuator, preferably depending on stored and/or self-learned pulse sequences.

The invention uses two actuators, namely one for a locking and/or unlocking, and another for a rotation of an element housing relative to an element foot in a rear view element of a motor vehicle. This hybrid form not only leads to a simple structure, but also to reduction in noise and an increase in adjustment speed or folding up speed, simultaneously with an unreduced service life.

As described herein, according to at least one embodiment when at least the actuator, which carries out an unlocking, uses at least one shape memory element (SMA element) and thus is an SMA actuator. An SMA element such as an SMA wire or an SMA spring, actually can namely be heated via a drive current surge so that it contracts and can itself act against the force of a spring element while contracting in order to release a lock which is secured by the spring element, preferably in a form-fit manner. Then in a cooling down phase, in which the SMA element returns to its original length, the spring element can also return to its original position in which it secures a lock, which in the case of a form-fit connection can also withstand relatively large forces. Only in the unlocked state, in which the spring element does not enforce a lock, a rotation can be conducted via the second actuator. This rotation can be enabled by means of any drive, for example again via an SMA actuator or a standard electromotor.

In a further preferred embodiment of the invention, the second actuator comprises a Bowden cable with an inner cable comprising an active material, in particular a shaped memory alloy, wherein the inner cable connects the first engagement element to the element foot.

This allows for a particularly compact construction of the rear view element folding device, as a Bowden cable requires significantly less space than for example an electric motor. Moreover, a Bowden cable can be used to directly drive the folding motion without the need for additional gears or the like.

In a further preferred embodiment of the invention, the second actuator comprises at least one piezo actuator.

This is a further, very compact embodiment, which can be used either for a gearless or geared drive. Furthermore, a piezo actuator can provide a very small step size, thus allowing for a particularly fine control of motion.

The controlling of both actuators can occur in dependence on output values of sensors, on the one hand for the precise setting of the respective movement, i.e. the translation movement of the first actuator and the rotational movement of the second actuator. On the other hand, the sensors also make it possible to react to external circumstances, such as for example an obstacle close to a rear view element. If for example an obstacle is captured on the passenger side, the rear view element on the passenger side can quickly be folded up to the motor vehicle via the rear view element folding device according to the invention, in order to avoid a damage occurring. Such a folding-up is also possible on the drive side, although coupled with a driving speed, for example up to a speed of 6 km per hour, which is generally associated with parking or reversing out of a parking space. However, folding up in reaction to captured vibrations, caused either by a driving motion per se or by the area surrounding the motor vehicle, for example in cases of bad weather is also possible with a rear view element folding device according to the invention.

In a further preferred embodiment of the invention, the at least one sensor device is a resistance sensor detecting an inner resistance of an SMA element of the first and/or second actuator.

The internal structural change of an SMA element is directly related to further physical properties, such as the resistance. For this reason, the state of an SMA actuator can be reliably monitored by a resistance measurement without the need for any further sensors. Since the resistance sensor can be easily integrated into the circuit controlling the SMA actuator, this is a particularly compact arrangement.

Around the spring element 7 runs concentrically a plurality of SMA wires 8 or an SMA wire, having several coils as part of a further actuator. Each SMA wire 8 here engages on the engagement element 6 on the one hand, and on the other hand on the basic body 2, as does the spring element 7. A passage 9 is located near the drive motor 3.

This is an alternative, compact and efficient sensor setup. The micro switch or contact surface can for example be directly integrated into the engagement elements, thus allowing for a direct monitoring of their engagement stage. This embodiment provides very fast reaction times regarding the sensing of the actuator states and consequently minimizes unnecessary control actions, which, for example, could reduce the life time of an SMA actuator.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 1A:
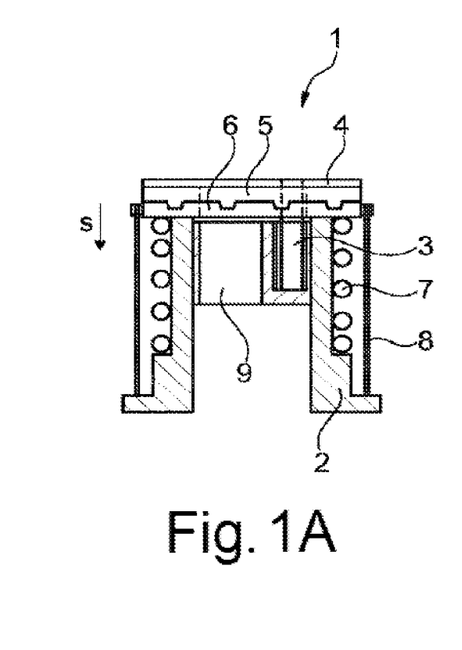
FIG. 1A is a profile view to a rear view element folding device according to a first embodiment of the invention, in a locking position.
Figure 1B:
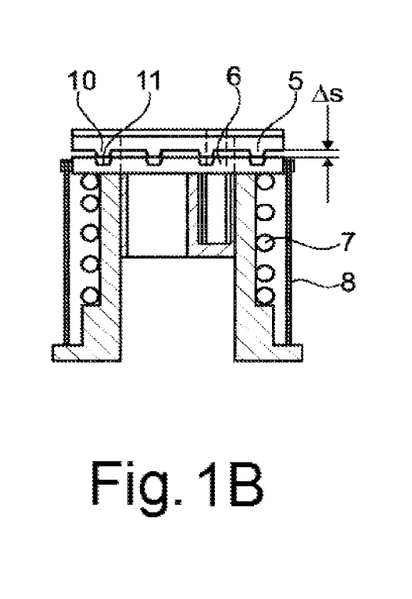
FIG. 1B is a profile view to the rear view element folding device of FIG. 1A, in an unlocking position.
Figure 1C:
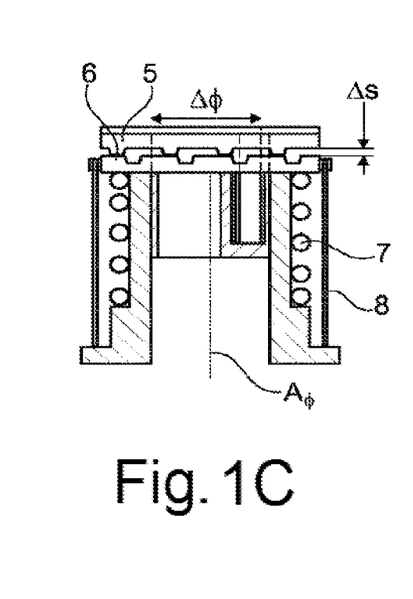
FIG. 1C is a profile view to the rear view element folding device of FIG. 1B, when approaching a rotational position.

FIGS. 1A to 1C show a rear view element folding device according to the invention for example in form of a rear view mirror folding device 1, which uses a basic body 2 which is either provided by a mirror foot, not shown, or is firmly attached thereto, in order to support further elements. Thus, a drive motor 3 is arranged as part of an actuator for a rotational movement in the basic body 2 which comprises a hollow cylinder form, and is also a fixed there in order to engage a rotation element 4 via a gear stage, not shown, said rotation element for its part being attached to a mirror housing or mirror head, not shown, wherein a mirror element is provided in the mirror head. The rotation element 4 is firmly connected to an engagement element 5 or is formed with said element. According to FIG. 1A, this engagement element 5 firmly engages with a further engagement element 6, when a locking position is adopted. Between the engagement element 6 and the basic body 2, a spring element 6 and the basic body 2, a spring element 7 is arranged concentrically to the basic body 2.

Around the spring element 7 runs concentrically a plurality of SMA wires 8 or an SMA wire, having several coils as part of a further actuator. Each SMA wire 8 here engages on the engagement element 6 on the one hand, and on the other hand on the basic body 2 as does the spring element 7.

In the locking position shown in FIG. 1A, which represents a locked resting position, the spring element 7 presses the engagement element 6 onto the engagement element 5 for locking purposes. Here, trapezoid protrusions 10 on the engagement element 5 engage in complementary recesses 11 of the engagement element 6. The engagement elements 5, 6 can be formed a gear rings. The engagement elements 5, 6 can however also be formed as clamping, breaking or latching elements, i.e. also function as frictionally engaged brakes, for example.

If a mechanical torque is applied to the rotation element 4, due to the trapezoid form of the protrusion 10 and thus also of the recesses 11, the engagement between the two engagement elements 5, 6 can be released, whereby the spring element 7 is compressed. This is used for the so-called child's head test, which tests whether the rear view mirror folds away when a rear view mirror collides with a child's head.

If a current impulse is applied to the SMA wires 8, these heat up in contract as a result, so that the spring element 7 is compressed, as can be seen in FIG. 1B. Here, a gap ΔS is opened along the translation direction S between the two engagement elements 5 and 6, and thus the engagement of the protrusions 10 on the recesses 11 is released, so that an unlocking occurs as is shown in FIG. 1B. In other words, the contraction of the SMA wires 8 leads to an actuating power which is greater than the pressure force of the spring element 7. This leads to a decoupling of the engagement elements 5 and 6, so that the rotation element 4 together with the engagement element 5 is then only radially mounted around a guide counter of the basic body 2, while a linear displacement, i.e. a translation, of the rotation element 4 together with the engagement element 5 is no longer possible.

In the unlocked resting state shown in FIG. 1B, it is possible to affect a rotation of the engagement element 5 relative to the engagement element 6 by switching on the drive motor 3, namely around the rotation axis AΦ by a certain rotation angle ΔΦ, is indicated in FIG. 1C. The drive motor thus generates a low torque following activation, which is guided over the gear stage onto the engagement element 5 together with the rotation element 4, so that a rotation of these two parts occurs.

In order to monitor the travel path of the drive motor 3, a rotation angle sensor, such a potentiometer, a Hall effect sensor or also an induction sensor, can be used. Alternatively, it is also possible to query all positions by means of mechanical end switches.

For unlocking purposes, it is advantageous when a current is applied to all SMA wires 8 at the same time, preferably in each case with a brief current surge, so that an even unlocking does in fact take place. As soon as no further current is applied to the SMA wires 8, these wires cool down again, so that a renewed locking automatically occurs, since the SMA wires 8 expand respectively into their original length. In order to lengthen the time period of the unlocking procedure, several brief current surges can be applied to the SMA wires 8.

The travel path which acts to open the gap AS when the SMA wires 8 contract can occur in such a manner that it is controlled via a Hall effect sensor, a current control device, a resistance measurement or similar.

Instead of SMA wires, SMA tension springs can also be used, for example evenly distributed around the circumference of the spring element 7. The dimensioning of the force of the SMA actuator can be conducted over the number of SMA wires 8. The higher the required actuating force is, the more SMA wires are needed. Monitoring of the travel path of the SMA wires can be conducted via resistance regulation. Here, the change in electric resistance can be monitored via a measurement amplifier. These changes are significant with increasing ΔS. In case of critical resistance values or an identification of a certain gradient of the resistance changes over the time, a set stop point can automatically be determined. The recording of a set stop point can alternatively be achieved via a mechanical end switch. A two-position controller can record the signal of a stop point and in the logical state of the current source for the SMA wires can switch between a "heating" and "cooling" parameter by switching the current supply on and off.

Figure 2:
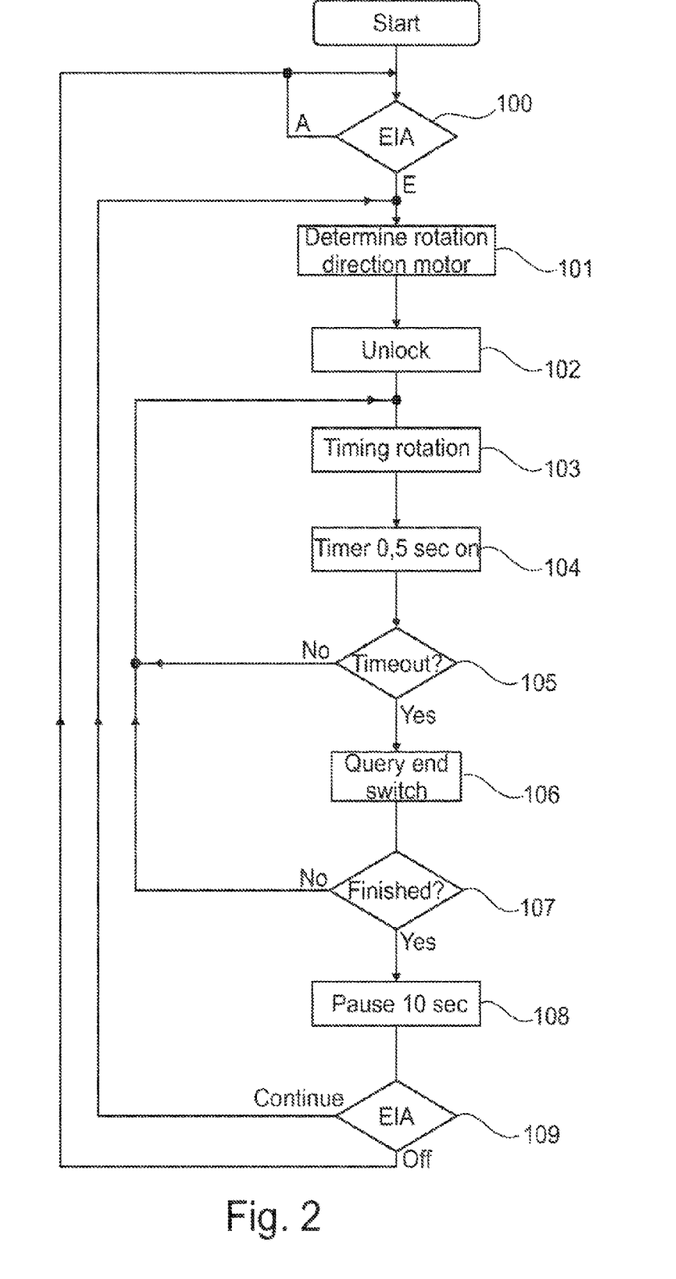
FIG. 2 is a flow chart of an approach of a rotational position by means of the rear view element folding device as shown in FIGS. 1A-1C.

In FIG. 2, the progress of a folding up procedure of a rear view element with a rear view element folding device 1 according to the invention is again shown. In a first step 100, the device 1 is switches on and then in a second step 101 the rotation direction of the drive motor 3 required for folding down is determined. In a third step 102 an unlocking is effected via the SMA actuator, namely by applying a current pulse to each of the SMA wires 8, as shown in FIG. 1B. Then, a rotation from the extended resting position into the folding down position is conducted via the drive motor 3, preferably in a timed manner, during a plurality of cycles, each with a duration of 0.5 sec, as indicated by the step sequence 103, 104 and 105.

In the same timing, further current impulses are applied onto the SMA wires 8, in order to keep them warm and thus shortened, so that an unlocking a guaranteed. If in a next step 106 a signal issued from a sensor in the form of e.g. an end switch that the desired end position has been achieved, the rotation is ended, as indicated by steps 107 and 108, so that finally, in step 109, the device 1 can be switched off.

If due to a termination of an application of current on the SMA wires 8 a cooling of said wires occurs, these SMA wires 8 contract, wherein the enforce a sliding in of the protrusions 10 into the recesses 11, so that the unlocking position according to FIG. 1A is again taken up.

The SMA wires 8 can be kept "warm" at a first temperature by suitable application of current impulses, in order to be able to complete a certain rotation procedure. The SMA wires can be kept at a second temperature in order to still ensure a locking, but also to enable fast unlocking. In other words, via the setting of the temperature of the SMA wires 8 a control of the hybrid system of the rear view element folding device 1 according to the invention can be effected.

Without being bound to theory, the fundamental basis for the behavior of the metallic SMA according to the various embodiments of the invention is provided by a reversible martensitic phase transformation; i.e. a high-temperature phase transforms into a low-temperature phase, with a change in the crystal structure. In the case of NiTi, the high-temperature phase is designated as austenite, and the low-temperature phase as martensite. A martensitic transformation has specific characteristic features. Since this involves a diffusionless cooperative shear movement of the lattice, it can take place even at temperatures well below the melting temperature. When measured in terms of the interatomic distances, the displacements produced by the shearing are comparatively small. Although the crystal structure changes, the short-range order of the lattice is not disturbed, and the closest neighbors are retained. This behavior can be checked by measurement techniques by way of the electrical resistance, or, conversely, as a result of this effect, a control system can be designed in such a way that the resistance is never so low that a transformation takes place for as long as the locking mechanism is to be held open. Thus, SMA wire can be used as a sensor.

Figure 3A:
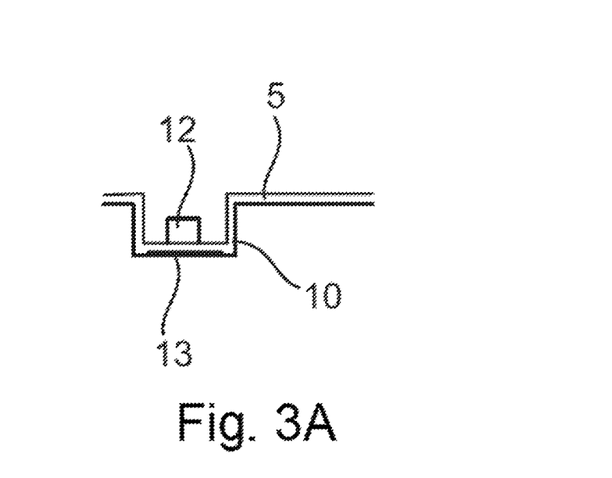
FIG. 3A is a schematic representation of a micro switch for detecting the locking status of a rear view element folding device according to a second embodiment of the invention, with a sensor.
Figure 3B:
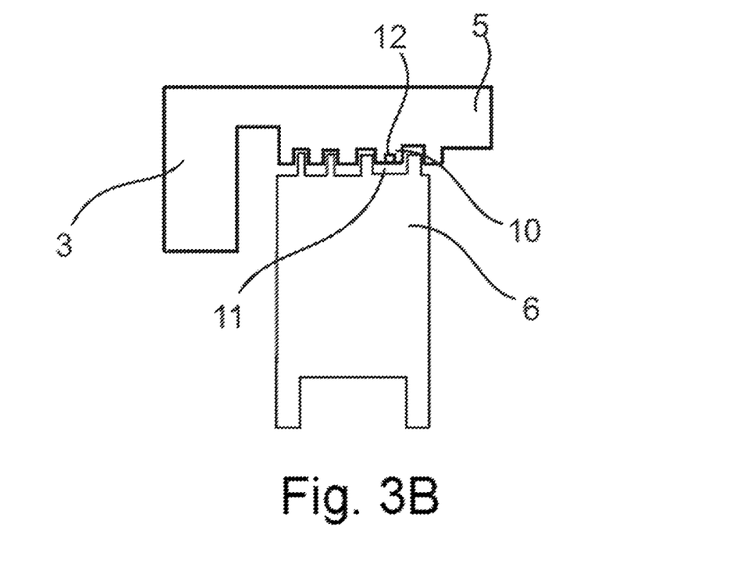
FIG. 3B is a schematic representation of the position of the micro switch according to FIG. 3A within the engagement elements.

As shown in FIGS. 3A and 3B, a sensor in form of a micro switch 12 can be used to monitor the locking state of the engagement elements 5, 6. The micro switch 12 is preferentially integrated into the protrusions 10 or recesses 11 of the engagement elements 5, 6. Alternatively, or in combination, a contact surface 13 can be employed to detect the locked or unlocked state, respectively.

This method is very reliable, in particular for applications with influencing temperatures from −40 to +85° C. The integration of such a micro switch 12 acting as a limit switch which is engaged at a defined path length secures the system to the extent that the folding device 1 remains open in a defined manner for as long as desired. If it is intended that the folding device 1 should cool off, a change of state of the wire 8 can be registered after path length changes of only 0.1 mm, and a new pulse can be caused to flow through the wire 8, which then immediately reengages the engaging elements 5, 6. Then, the resulting electrical contact can interrupt the current feed again, so that the wire 8 is kept at an optimal temperature. Ideally, the temperature to which the wire 8 is heated should lie exactly where the structural transformation of the SMA wire 8 takes place, namely at its martensite-austenite transition point. Furthermore, the exact regulation around the transition time has other advantages, including a particularly long service life of the SMA wire 8, shorter cooling periods during locking, and greater safety and reliability thanks to the direct relationship between movement, actuation of the micro switch 12 and the resulting current flow through the wire 8.

The same advantage can be achieved by employing a contact surface 13. In both cases, the contact surface 13 or the micro switch 12 need to have a very low spring constant, so as to ensure that the pressure on the teeth of the engagement elements 5, 6 is limited.

If the SMA wire 8 is inserted into a solid casing and fixed as well as contacted at one end, the other end can be contacted with the locking system in order to be driven.

Figure 4:
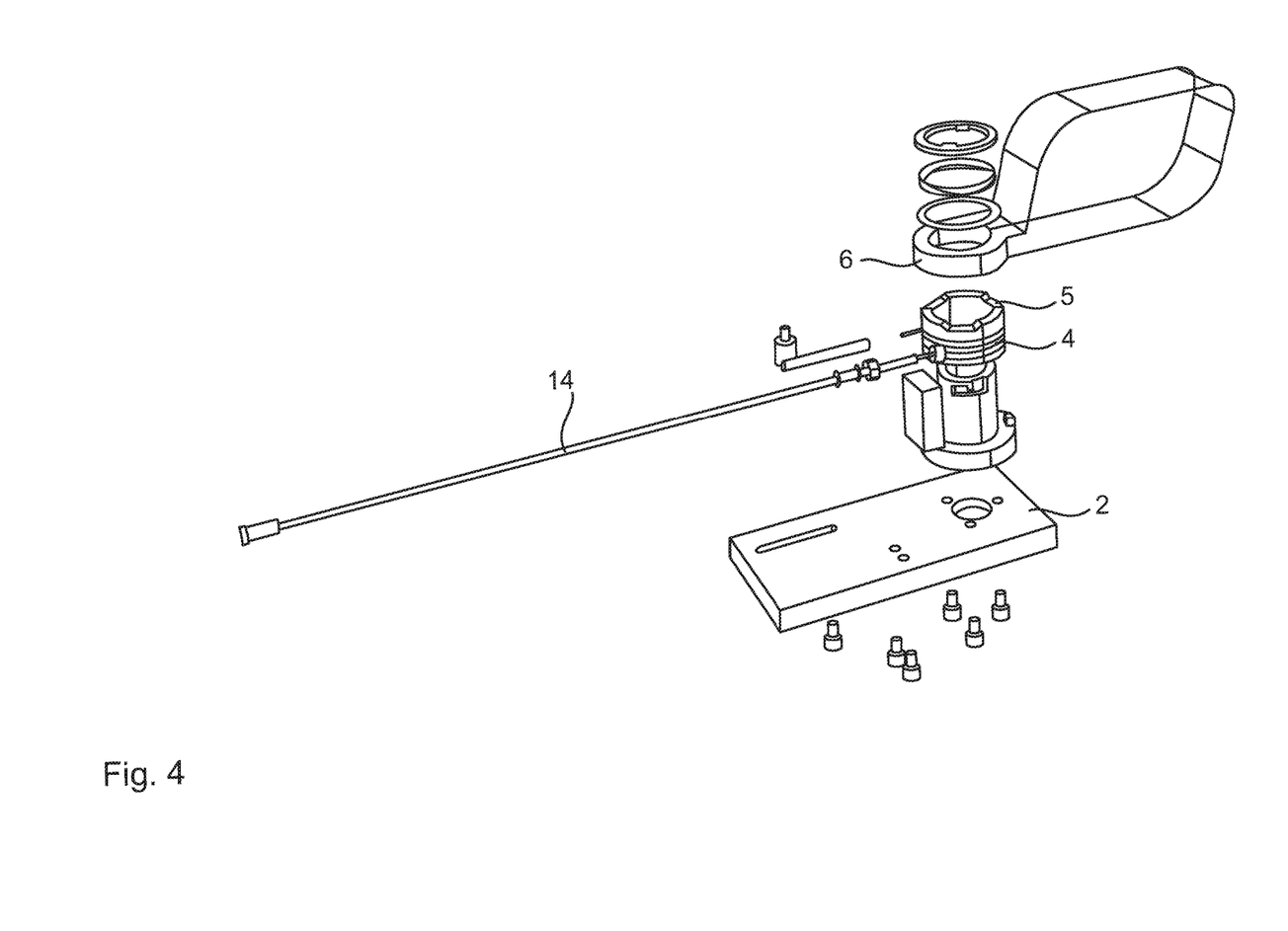
FIG. 4 is a perspective representation of a Bowden cable actuator for a rear view element folding device according to a third embodiment of the invention.
Figure 5:
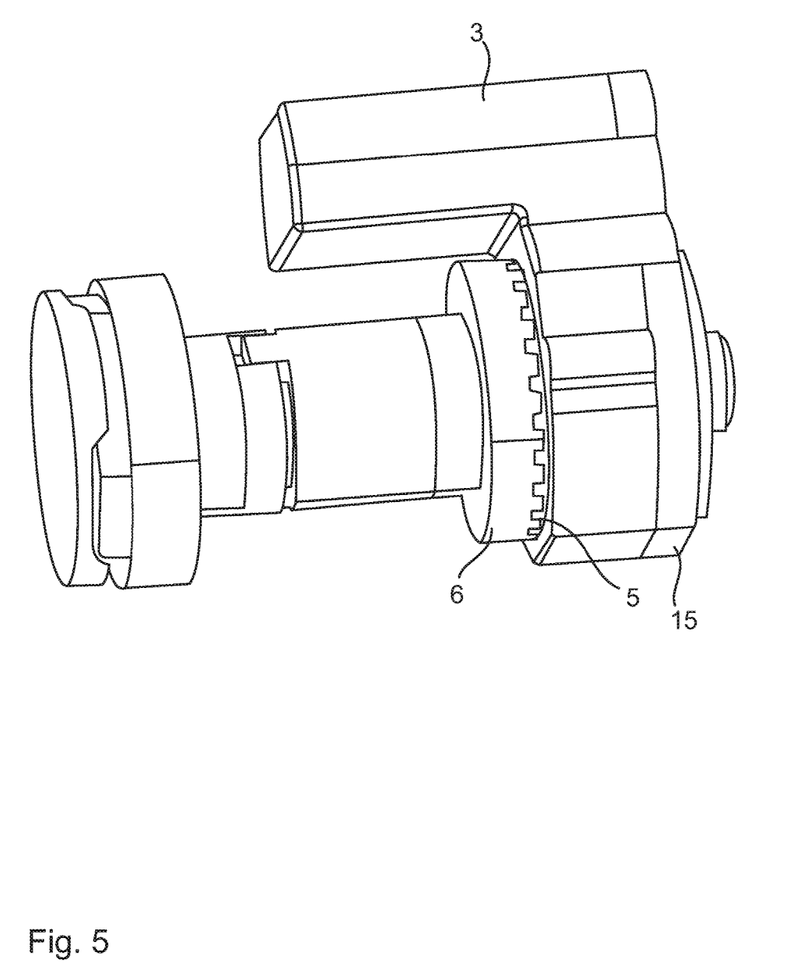
FIG. 5 depicts a rear view element folding device according to a fourth embodiment of the invention, with a drive motor in a perspective view.

In a further embodiment, as shown in FIG. 4, a Boden cable 14 can be utilized instead of a drive motor 3. The Bowden cable 14 comprises an internal cable manufactured from a shape memory alloy and thus can be controlled by heating or cooling. The Bowden cable 14 connects to the rotation part 4 and to a non-moving part of the vehicle, such as a door frame or the like. Since this embodiment neither needs a separate motor 3 or gearing 15, as shown in FIG. 5, it is particularly compact.

The Bowden cable 14 can be routed together with electric cables supplying the rear view device 1 with current, usually through the base 2 of the rear view device 1 into the interior of the door. The Bowden cable routing at the base 2 of the rear view device must be free of any sharp kinks. Preferably, the inner cable has a diameter of 0.5 mm and a deflection radius of no more than 16 mm.

The basis for the definition of the behavior of such a SMA based Bowden cable 14 is provided by using a reversible temperature dependent martensitic phase transformation of the inner cable. As already mentioned above, in the case of NiTi-alloys, the high temperature phase is an austenite phase, while the low-temperature phase is martensitic. When measured in terms of the interatomic distances, the shear movements of the lattice and the corresponding displacements produced by the shearing are comparatively small. Although the crystal structure changes, the short-range order of the lattice is not disturbed, and the closest neighbors of each lattice point atom are retained. This behavior can be monitored by the measurement of the electrical resistance. Consequently, a control system can be designed in such a way that the resistance is never so low that a transformation takes place for as long as the locking mechanism is to be held open.

Figure 6:
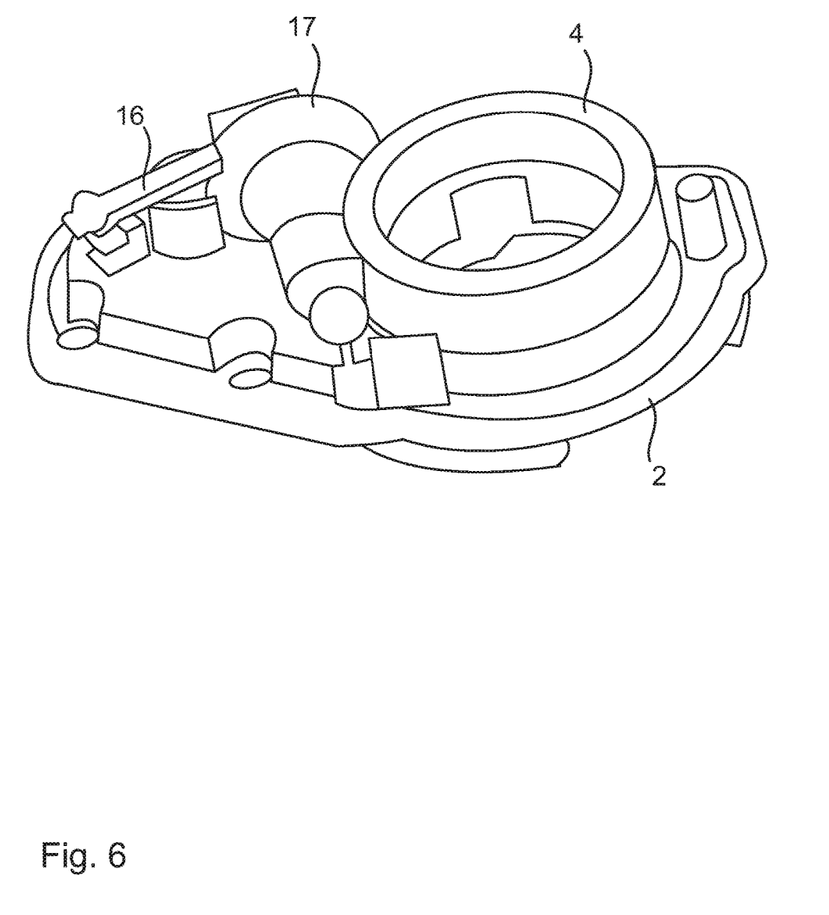
FIG. 6 is a perspective view of a rear view element folding device according to a fifth embodiment of the invention, with a piezo actuator.
Figure 7:
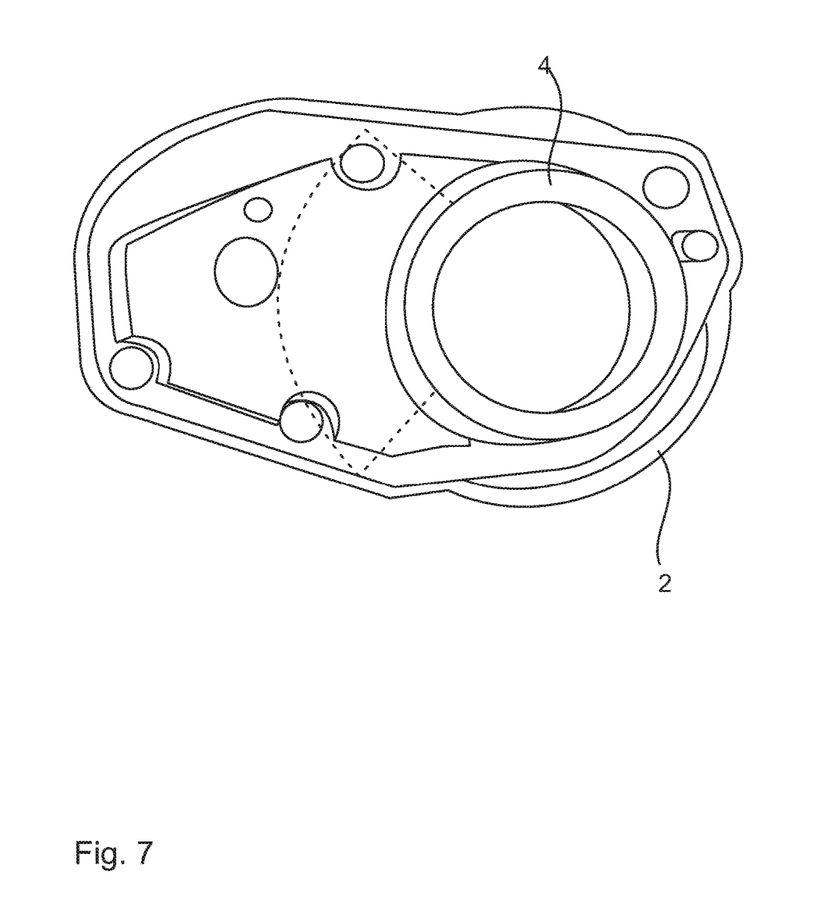
FIG. 7 is a top-down representation of the rear view folding device according to a sixth embodiment of the invention, with a piezo actuator.
Figure 8:
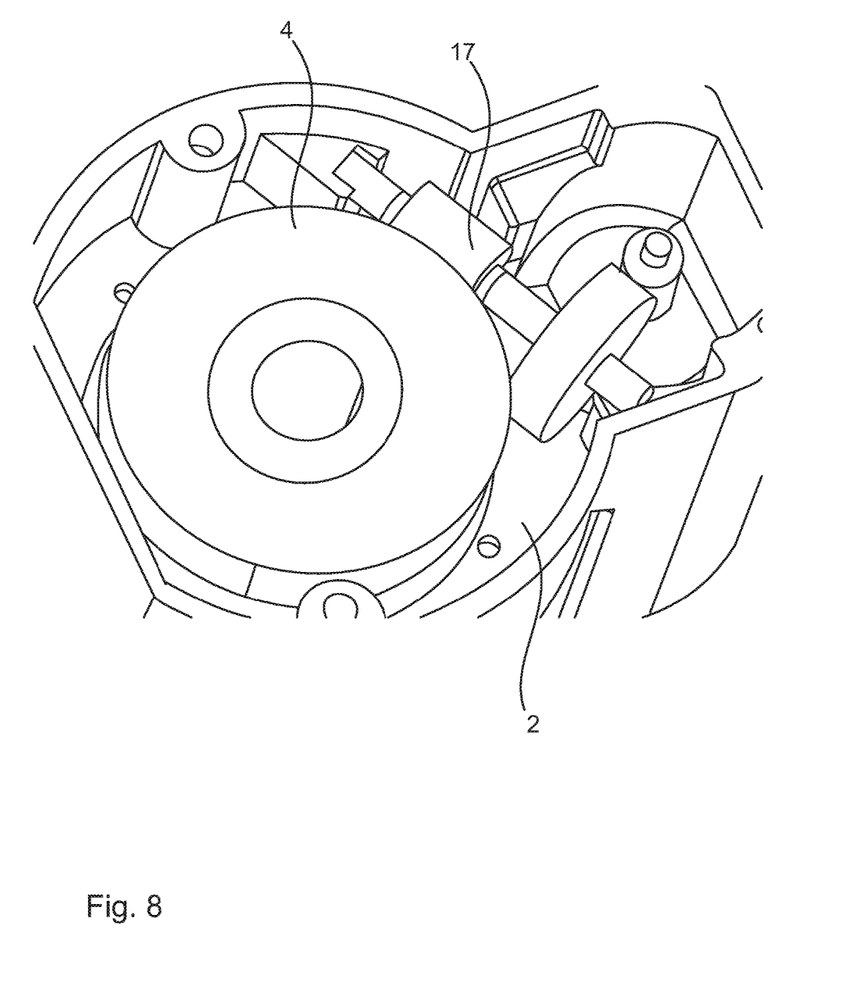
FIG. 8 is a further perspective representation of the rear view folding device according to FIG. 6.

In further embodiments shown in FIGS. 6 to 8, a piezo actuator 16 can be used instead of the drive motor 3. The piezo actuator 16 can contact the rotation element 4 via a gear element 17, see FIG. 6. Alternatively, the rotation element 4 can be driven directly by the piezo actuator 16, as depicted in FIG. 7. In the latter case, the diameter of the rotation element 4 may be increased as shown by the dashed outlines in FIG. 7. The piezo actuator 16 is preferably driven with a frequency of about 1 kHz. Due to the resulting small step size, its speed can be very precisely adjusted by the applied driving frequency. FIG. 8 depicts the possible application locations of the piezo actuator 16 in a perspective view.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. A rear view element folding device for a motor vehicle for approaching at least one rotational position of an element housing relative to an element foot than can be mounted on the motor vehicle, and for locking or unlocking at least one resting position of the element housing relative to the element foot, wherein
    a first actuator for a translation movement of a first engagement element that is firmly connected to the element housing relative to a second engagement element that is connected to the element foot along a rotation axis, wherein the first engagement element and the second engagement element in locking position, such as a locked resting position of the element housing, stand in a fixed engagement with each other and in an unlocking position, such as an unlocked resting position of the element housing, the engagement is released by a certain translation movement, and
    a second, separate actuator for a rotational movement for rotating the first engagement element relative to the second engagement element around the rotation axis, wherein through a first rotational movement, a first rotation position of the element housing can be approached from the unlocked resting position, and through a second rotation movement of the element housing, which is counter to the first rotational movement, the unlocked resting position can be approached from the first rotational position, wherein the second actuator comprises a Bowden cable having an inner cable comprising at least one of an active material or a shaped memory alloy, wherein the inner cable connects the first engagement element to the element foot.

2. The rear view element folding device according to claim 1, wherein at least one spring element in the locking position applies a force onto the first and/or second engagement element, and
    the first actuator moves the first or second engagement element against the force of the spring element during the change from the locking position into the unlocking position, in particular with a lifting movement, wherein preferably, the first actuator holds the unlocking position for a certain period of time.

3. The rear view element folding device according to claim 1, wherein the first actuator uses an active material, in particular as an SMA drive, piezo drive or a drive designed with an electroactive polymer, wherein preferably, the SMA drive uses at least one SMA element, in particular in the form of an SMA wire or an SMA spring, on which a current can be applied for the change from the locking position into the unlocking position, in particular in form of at least one current surge and/or over a certain period of time.

4. The rear view element folding device according to claim 3, wherein the spring element comprises a spiral spring, concentrically to which the SMA element(s) run, in particular in an evenly distributed manner, and/or each SMA element is shortened through heating when the current is applied, so that the spring element is compressed from a locking state into an unlocking state, while during the cooling of the SMA element, the spring element returns from the unlocking state, in particular automatically, into the locking state, and/or
the first actuator can be adjusted depending on a first travel sensor and/or by means of end switches, in particular mechanical end switches.

5. The rear view element folding device according to claim 1, wherein the second actuator uses an active material, a magnetic angle adjuster or a motor, in particular an electric motor, which preferably engages via a gear stage onto the first engagement element, and/or the second actuator can be adjusted depending on a second travel sensor and/or by means of end switches, in particular mechanical end switches.

6. The rear view element folding device according to claim 1, wherein the second actuator comprises at least one piezo actuator.

7. The rear view element folding device according to claim 1, wherein
    the first engagement element comprises at least one protrusion for engagement into a recess, which is preferably designed to be complementary to the protrusion, in the second engagement element and/or the second engagement element comprises at least one protrusion for engagement into a recess, preferably designed to be complementary to the protrusion in the first engagement element wherein preferably, a plurality of protrusions is provided, and/or preferably, each protrusion comprises a trapezoid form in its profile, and/or preferably, the first engagement element comprises a first ring and the second engagement element comprises a second ring, wherein the rings are arranged concentrically to the rotation axis, and/or the first engagement element is formed as a first gear ring and/or a first clamping element, brake element and/or latching element, and the second engagement element is formed as a second gear ring and/or a second clamping element, brake element and/or latching element.

8. The rear view element folding device according to claim 1, wherein the element foot comprises a basic body, in particular having a cylindrical form, or is firmly connected thereto, the spring element engages on the basic body and the second engagement element, and the first actuator engages on the basic body and the second engagement element, so that a locking device is provided in a cylindrical form, in particular a hollow cylindrical form.

9. The rear view element folding device according to claim 1, wherein a control or regulating device for the first and/or second actuator interacts with at least one sensor device, and/or the control or regulating device, the first actuator and/or the second actuator are arranged at least partially in the locking device, in particular in the hollow cylinder.

10. The rear view element folding device according to claim 9, wherein the at least one sensor device is a resistance sensor detecting an inner resistance of an SMA element of the first and/or second actuator.

11. The rear view element folding device according to claim 9, wherein the at least one sensor device comprises a micro switch and/or an electrical contact surface which is actuated when the first and second engagement element are engaged in the locking position.

12. The rear view element folding device according to claim 9, wherein the sensor device comprises a first sensor for sensing a travel path of the first actuator, such as in the form of a resistance sensor, Hall effect sensor, temperature sensor or current sensor in combination with at least one stop, a second sensor for sensing a travel path of the second actuator, such as in the form of rotation angle sensor or current sensor in combination with at least one stop, a third sensor for detecting obstacles in the area of the rear view element, a fourth sensor for capturing vibrations, and/or a fifth sensor for capturing the road and/or driving motion.

13. The rear view element folding device according to claim 1, wherein the rear view element comprises at least one mirror element and/or a camera.

14. The rear view element folding device according to claim 1, wherein in the locking position, a form fit is provided between the first and second engagement element.

* * * * *